United States Patent [19]

Taylor

[11] 4,043,437

[45] Aug. 23, 1977

[54] TORQUE LIMITING CLUTCH BRAKE

[75] Inventor: Frederick P. Taylor, Bridgeport, N.Y.

[73] Assignee: Lipe-Rollway Corporation, Syracuse, N.Y.

[21] Appl. No.: 642,350

[22] Filed: Dec. 19, 1975

[51] Int. Cl.$^2$ .............................................. F16D 3/66
[52] U.S. Cl. ............................. 192/13 R; 192/106.1; 188/218 XL; 64/29
[58] Field of Search ............... 192/106.1, 106.2, 13 R, 192/7 R; 188/71.2, 218 XL; 64/29

[56] References Cited

U.S. PATENT DOCUMENTS

| | | | |
|---|---|---|---|
| 1,125,739 | 1/1915 | Schneider | 64/29 |
| 1,704,503 | 3/1929 | Gamble | 192/106.1 |
| 1,959,213 | 5/1934 | Nygard | 192/106.1 |
| 2,017,591 | 10/1935 | Dumm | 192/106.1 |
| 2,461,447 | 2/1949 | Siesel | 64/29 |
| 2,775,105 | 12/1956 | Banker | 192/106.1 |
| 3,763,977 | 10/1973 | Sink | 192/13 R |

Primary Examiner—Benjamin W. Wyche
Attorney, Agent, or Firm—Bruns & Jenney

[57] ABSTRACT

A torque limiting brake for a heavy duty automotive clutch. The brake, which is keyed to the driven shaft, is engaged by the release mechanism when the clutch is disengaged and moved into engagement with an adjacent stationary surface. This operates to stop the rotation of the driven shaft which tends to continue rotating due to inertia. To prevent damage to the brake when excessive braking pressure is applied, a yieldable connection is provided between the brake inner portion that is keyed to the driven shaft and its outer portion that engages the stationary surface whereby the former can have limited rotation relative to the latter if the braking pressure exceeds a predetermined amount.

5 Claims, 5 Drawing Figures

4,043,437

TORQUE LIMITING CLUTCH BRAKE

BACKGROUND OF THE INVENTION

This invention relates generally to friction clutches, and has particular reference to a novel torque limiting brake for heavy duty automotive clutches.

Brakes for friction clutches have been developed and used heretofore, the purpose of the brake being to stop the rotation of the driven shaft upon disengagement of the clutch. Without a brake, the driven shaft tends to continue rotating after disengagement due to inertia and this causes transmission damaging gear clash in ensuing gear shifting operations. Clutch brakes of the type referred to are disclosed in U.S. Pat. Nos. 2,863,537 and 3,179,217, granted Dec. 9, 1958 and Apr. 20, 1965 respectively to R. S. Root and assigned to the assignee of the present invention.

While clutch brakes minimize damage and noise during gear shifting in motor vehicles, it has been found that the brake itself can become damaged by the application of excessive braking pressure. Thus, excessive torsional loads on the tangs that key the brake to the driven shaft can ultimately cause the tangs to shear. To solve this problem, torque limiting clutch brakes have been developed, such a brake being disclosed in U.S. Pat. No. 3,763,977, granted Oct. 9, 1973 to W. H. Sink. In the Sink brake, which is the closest prior art known to the applicants, pre-loaded Belleville washers are located between an outer friction section and inner brake section and these allow the inner section to slip relative to the outer section when excessive braking pressure is applied.

The applicant herein is one of the applicants in an earlier filed copending application Ser. No. 612,374, filed Sept. 11, 1975, that is directed to a different modification of the torque limiting clutch brake disclosed in the present application.

SUMMARY OF THE INVENTION

The torque limiting clutch brake of the invention includes an inner annular plate that is keyed to the driven shaft and an assembly of outer annular plates that encircles the inner plate, the encircling assembly being arranged to be moved by the clutch release mechanism into engagement with an adjacent stationary surface. The inner plate is provided on its outer periphery with a plurality of arcuate projections. These are engaged by a pair of fluted spring strips the ends of which are received in one of the plates of the encircling assembly. This provides a yieldable connection between the encircling assembly and inner plate whereby, when the force applied to the encircling assembly by the release mechanism exceeds a predetermined amount, the arcuate projections force the spring strips outwardly and advance to successive conforming fluted portions of the spring strips.

DESCRIPTION OF THE PREFERRED EMBODIMENT

Figure 1:
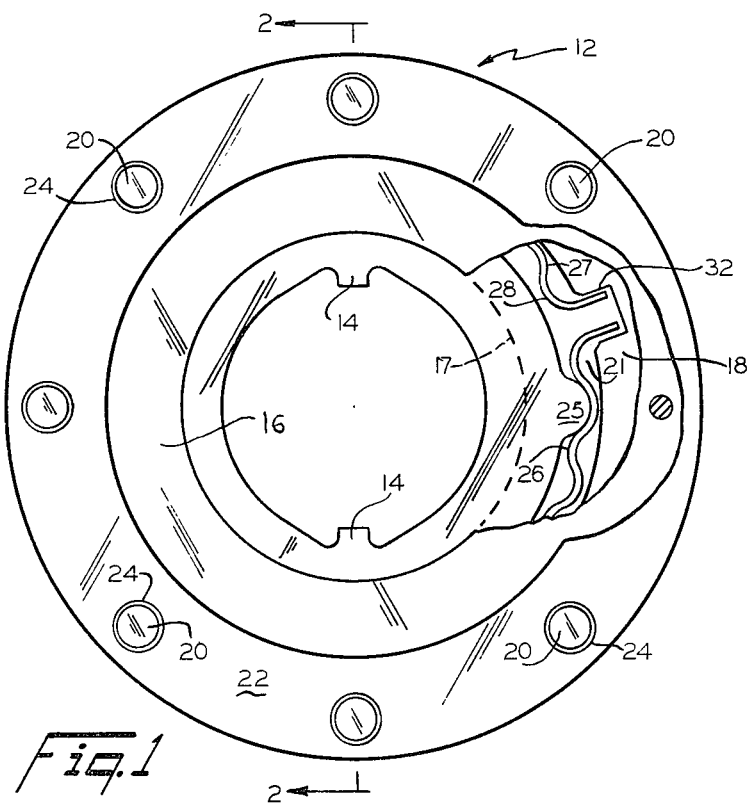
FIG. 1 is a side elevation of a torque limiting clutch brake embodying the invention, with parts broken away to better show the construction.

Referring now to the drawings, the clutch brake that is disclosed herein is for use in an otherwise conventional friction clutch 7 such as that disclosed in Root U.S. Pat. No. 3,179,217, cited above. Accordingly, reference may be had to the Root patent for a description of the function and operation of the conventional clutch components, including the release mechanism 8 that actuates the brake. The brake is keyed to but axially movable on the driven shaft 11, and when the clutch is disengaged the brake is engaged by the release mechanism and moved into engagement with an adjacent stationary surface such as a portion of the transmission housing 9. This operates to stop the rotation of the driven shaft which normally tends to continue rotating after disengagement due to inertia.

Figure 2:
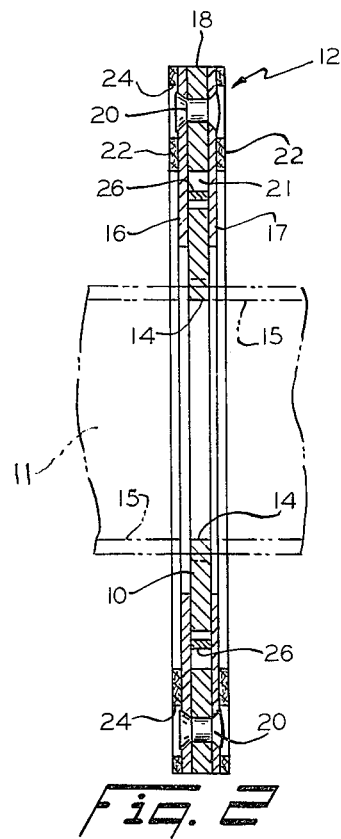
FIG. 2 is a vertical section through the clutch brake taken on line 2—2 of FIG. 1.

The clutch brake of the invention is essentially comprised of an inner annular plate 10 that is keyed to the driven shaft 11, FIG. 2, and an outer plate assembly generally indicated at 12 that encircles the inner plate in a manner to be described. The keying is effected by a pair of tangs 14 on the inner plate that are received with sliding fit in longitudinal grooves 15 in the shaft.

The outer plate assembly 12 includes a pair of annular exterior plates 16 and 17 that partially overlie the inner plate 10 on opposite sides thereof as shown. The plates 16 and 17 are spaced apart by an annular spacer ring 18 that is concentric with the inner plate, the plates 16, 17 and ring 18 being secured together as by rivets 20. A clearance space indicated at 21 in FIGS. 1-3 is provided between inner plate 10 and ring 18 so that one can move freely relative to the other.

A ring 22 of conventional friction facing material is bonded to the outer side of each plate 16 and 17, and during disengagement of the clutch the facing material on plate 16, for example, is engaged by a flat surface on the release mechanism 8. The release mechanism moves the brake until the facing material on plate 17 engages a flat surface on the transmission housing 9 whereby the brake is in effect clamped between the release mechanism and housing. The facing material rings 22 are provided with apertures 24 to accommodate the rivets 20.

Figure 3:
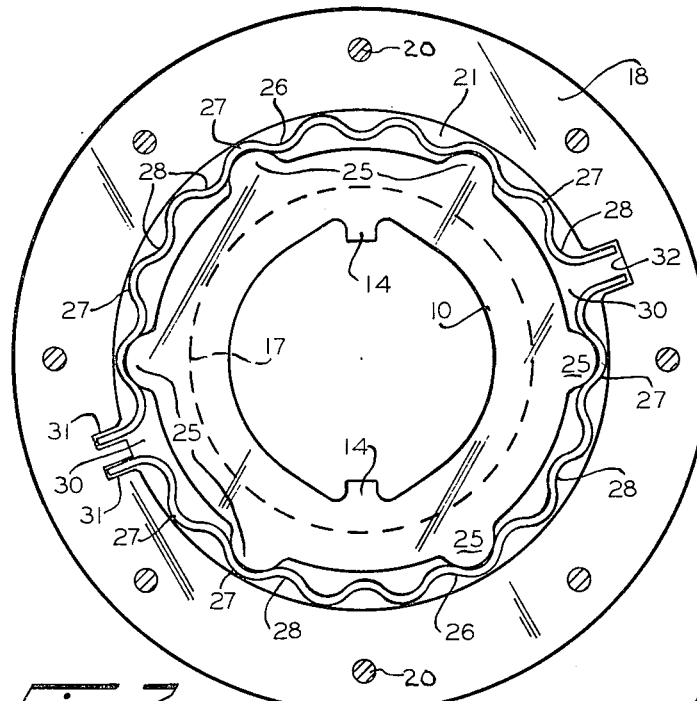
FIG. 3 is a view corresponding to FIG. 1 but with one of the exterior plates of the encircling assembly removed to better show the interior construction.

The inner annular plate 10 is provided on its outer periphery with a plurality of uniformly spaced arcuate projections or protuberances 25 as best shown in FIG. 3. These projections are engaged by a pair of fluted spring strips 26 having a width substantially equal to the thickness of the inner plate 10 as indicated in FIG. 2. Looking from the center of the clutch brake outwardly, the spring strips 26 can be regarded as having alternate recessed portions 27 and projecting portions 28 with the spaces 30 between the ends of strips operating as recessed portions. Because there are three times as many strip recessed portions 27, 30 as there are projections 25, only every third recessed portion receives a projection in the embodiment shown.

One end of each spring strip 26 is respectively received with a loose fit in a slot 31 in the annular spacer ring 18, FIG. 3. The other ends of the strips are both loosely received in a wider slot 32 in the spacer ring. The projections 25 and spring strips 26 provides a yieldable connection between the outer plate assembly 12 and inner plate 10, and in accord with the invention permit limited rotation of the latter relative to the former if the braking pressure exceeds a predetermined amount.

If the vehicle operator applies excessive pressure to the clutch pedal with the result that the clutch brake is slammed against the transmission housing, the inertia of drive shaft 11 will operate through the inner plate 10 to make the projections 25 force or spring the adjacent (in the direction of the inertial force) projecting portions 28 of the spring strips outwardly whereby the projections respectively advance from one spring strip recessed portion 27 to another. This is possible because there is room in the clearance space 21 for the spring strips to distort and, at the same time, the ends of the strips in the spacer ring slot 32 can move closer together as necessary.

Figure 4:
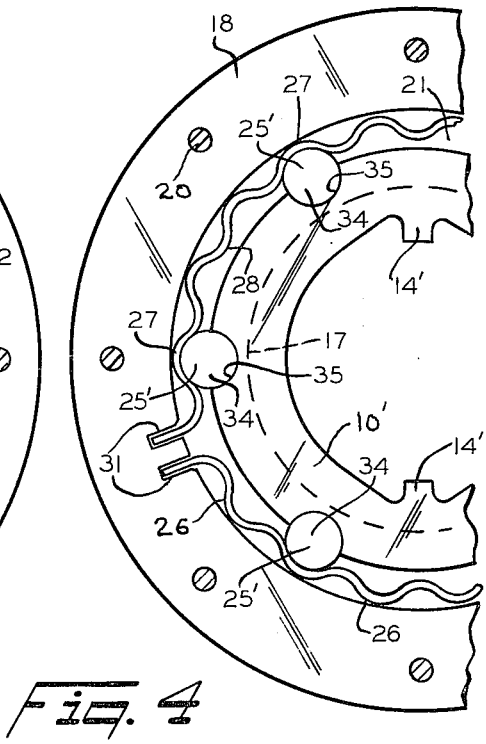
FIG. 4 is a fragmentary view corresponding to FIG. 3 showing a variation in the inner annular plate construction.
Figure 5:
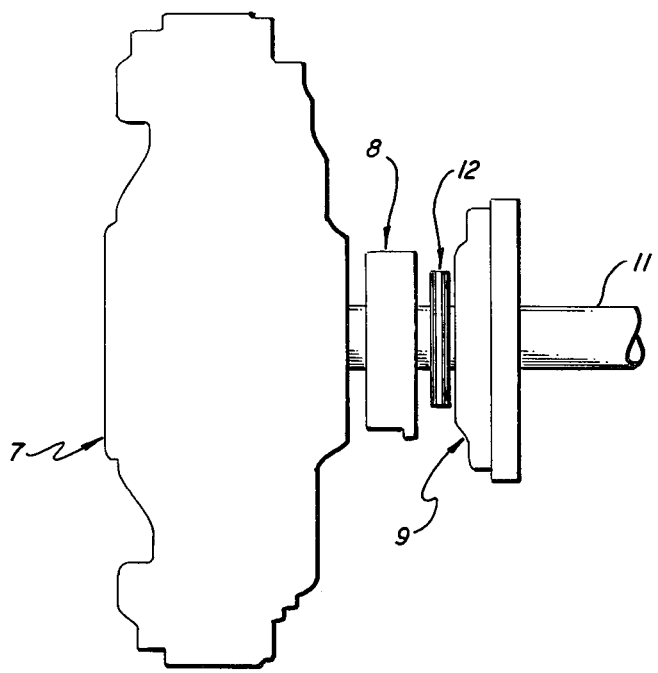
FIG. 5 is a reduced diagrammatic side elevation showing the location of the clutch brake with respect to the release mechanism and stationary surface with which it coacts.

FIG. 4 illustrates a variation in the construction of the inner annular plate. Thus, rather than having the arcuate projections 25 formed integrally with the plate 10 as in FIGS. 1-3, the projections 25' in the FIG. 4 variation are portions of separate discs 34 that are positioned in conforming recesses 35 in the inner plate 10'. The remaining components and the operation of the clutch brake are the same as described in connection with FIGS. 1-3.

From the foregoing description it will be apparent that the invention provides a novel torque limiting clutch brake that effectively minimizes damage and noise during gear shifting and at the same time makes provision for protecting the brake itself against damage when excessive braking pressure is applied. As will be understood by those familiar with the art, the invention may be embodied in the other specific forms without departing from the spirit or essential characteristics thereof.

What is claimed is:

1. In a friction clutch for connecting driving and driven shafts, the clutch including a release mechanism for effecting disengagement of the clutch, the improvement comprising a clutch brake cooperable with the release mechanism and a stationary surface adjacent the clutch comprising an inner annular plate keyed to the driven shaft, means encircling the inner plate and arranged to be moved by the release mechanism into engagement with the stationary surface during disengagement of the clutch, the encircling means including friction facing material where it is engaged by the release mechanism and stationary surface, and means yieldably connecting the encircling means to the inner plate including a plurality of uniformly spaced arcuate projections on the outer periphery of the inner plate and spring means connected to the encircling means and releasably engaging at least some of the projections, the spring means comprising a plurality of fluted spring strips having fitted portions at least some of which mate with the plate arcuate projections, the spring means being arranged to release and then re-engage the projections to permit relative movement between the encircling means and inner plate when the force applied to the encircling means by the release mechanism exceeds a predetermined amount.

2. A clutch as defined in claim 1 wherein the arcuate projections are formed integrally with the annular plate.

3. A clutch as defined in claim 1 wherein the annular plate is formed with a plurality of recesses in its outer periphery and the arcuate projections are formed by portions of disc elements positioned in the recesses.

4. In an automatic clutch for connecting driving and driven shafts, the clutch including a release mechanism for effecting disengagement of the clutch the improvement comprising, a torque limiting clutch brake cooperable with the release mechanism and a stationary surface adjacent the clutch comprising an inner annular plate keyed to the driven shaft, the plate having a plurality of uniformly spaced arcuate projections on its outer periphery, means encircling the inner plate and arranged to be moved by the release mechanism into engagement with the stationary surface during disengagement of the clutch, the encircling means comprising an annular ring concentric with and spaced outwardly from the inner plate and a pair of annular plates secured to opposite sides of the ring and partially overlapping the opposite sides of the inner plate, and a fluted spring strip connected to the annular ring and positioned in the space between the ring and the inner plate, the strip having fluted portions substantially conforming to the arcuate projections on the inner plate, the projections projecting into some of the spring strip fluted portions to provide a yieldable connection between the encircling means and inner plate, the arcuate projections being operable when the force applied to the encircling means by the release mechanism exceeds a predetermined amount to spring the spring strip outwardly whereby the projections can move to successive conforming fluted portions of the strip, thereby permitting relative movement between the encircling means and inner annular plate.

5. A clutch as defined in claim 4 wherein the ends of the fluted spring strip are received with a loose fit in slots in the annular ring.

* * * * *